(No Model.)
G. W. KEYSER.
ROLLER SKATE.
No. 307,553. Patented Nov. 4, 1884.
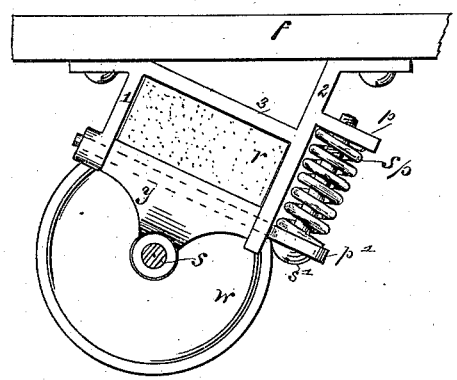
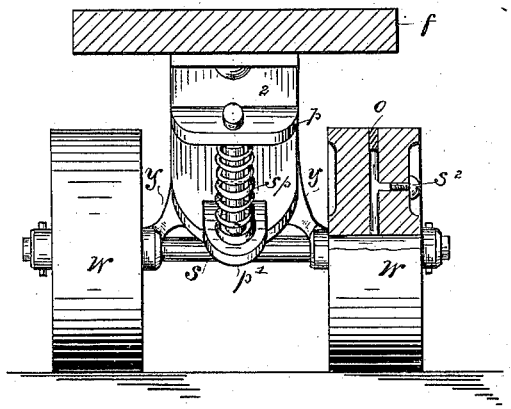
WITNESSES,
Jacob W. Loeper
Robt. W. Shilling
INVENTOR.
Geo. W. Keyser.
By C. P. Jacobs
atty.

UNITED STATES PATENT OFFICE.

GEORGE W. KEYSER, OF INDIANAPOLIS, INDIANA.

ROLLER-SKATE.

SPECIFICATION forming part of Letters Patent No. 307,553, dated November 4, 1884.

Application filed June 5, 1884. (No model.)

*To all whom it may concern:*

Be it known that I, GEORGE W. KEYSER, a resident of Indianapolis, Marion county, Indiana, have made certain new and useful Improvements in Roller-Skates, a description of which is set forth in the following specification, reference being made to the accompanying drawings, in the several figures of which like letters indicate like parts.

My improvement relates to the construction of the wheel-frames of roller-skates, and is an improvement upon a former device invented by me and shown in my application for Letters Patent filed March 19, of the present year.

In the drawings, Figure 1 is a side view of my device, and Fig. 2 is an end view, a portion of one wheel being cut away to show the oil-channels for lubricating the axle.

In detail $f$ is the foot-plate, to the under side of which is attached the frame-work composed of parts 1, 2, and 3, all made in one piece, and adapted to surround the rubber spring-block $r$. The loose rocker-bar $p'$ forms the under or fourth side of this frame-work, as described in my former application. This rocker-bar has a bearing in the part 1 in front and moves in an open slot in the part 2 in the rear, and a set-screw, $s'$, passing through the head of this rocker-bar, loosely engages with a thread formed in an opening in a projection, $p$, of the frame-work, so that by means of this set-screw a greater or less pressure may be brought to bear upon the rubber block by means of the rocker-bar $p'$; but the elasticity of this rubber $r$ is not enough, as a very great strain is brought upon all parts of the caster in skating; hence I provide an additional spring of coiled wire, $sp$, which surrounds the adjusting-screw, and this spring is compressed by the tightening and lengthened by the loosening of the set-screw $s'$. The adaptation of the parts to receive this spring and its attachment is a great improvement, as the parts are held more firmly and there is more elasticity under considerable pressure than where but one spring (the rubber) is used. The caster thus made combines strength, elasticity, lightness, and beauty of finish, and is well adapted to undergo great strains in use.

What I claim, and desire to secure by Letters Patent, is the following, viz:

1. The combination, in a caster for roller-skates, of the frame-work 1 2 3, the rubber core $r$, inclosed therein, the adjustable rocker-bar $p'$, set-screw $s'$, coiled spring $sp$, the yoke $y$, foot-plate $f$, wheels $w$, and axle $s$, substantially as described.

2. The frame-work 1 2 3, adjustable rocker-bar $p'$, rubber $r$, set-screw $s'$, spring $sp$, and the axle and wheels of a skate, substantially as described.

Witness my hand May 26, 1884.

GEO. W. KEYSER.

Witnesses:
C. P. JACOBS,
BENJ. C. WRIGHT.